March 22, 1966   R. L. VAN HUIS   3,241,653
FEED RETURN GATES
Filed Nov. 20, 1963

INVENTOR.
Robert L Van Huis
BY
Price + Heneveld

3,241,653
FEED RETURN GATES

Robert L. Van Huis, Zeeland, Mich., assignor to Big Dutchman, Inc., a corporation of Michigan
Filed Nov. 20, 1963, Ser. No. 325,048
4 Claims. (Cl. 198—57)

This invention relates to a feed return gate for a hopper and more particularly to a mechanical, automatically operated, poultry feeder having a novel feed return gate assembly by which excess feed returned by the conveyor system may be reintroduced into the bottom of the hopper.

Feed return gates for reintroducing to a hopper excess feed returned from the conveyor line have been developed and utilized for many years. For example, one such type of feed return gate is disclosed in the United States Patent 2,866,536 entitled "Feed Return Gate." The present invention is an improvement of the feed return gate disclosed in such patent.

Despite the improved results in the reduction of the piling up of feed at the point of entry of the conveyor chain into the hopper and the resultant spilling over of the feed over the sides of the trough as is accomplished by the feed return gate of Patent No. 2,866,536, still a problem of spillage by this means has not been eliminated. The feed return gates of said patent still resulted in some backing up and spilling of feed which resulted in the waste of feed.

The present invention overcomes these difficulties of the device of the aforesaid patent by providing a simple, inexpensive feed intake attachment comprising a pair of runners located beneath one of the gates thus causing the chain to lift up and allow the feed to fall through the links of the chain. This prevents piling up of feed in the conveyor trough and eliminates backing up and spilling of feed.

These and other objects and purposes of this invention will be immediately seen by those acquainted with the design and use of automatic poultry feeding equipment upon reading the following specification and the accompanying drawings.

Figure 1:
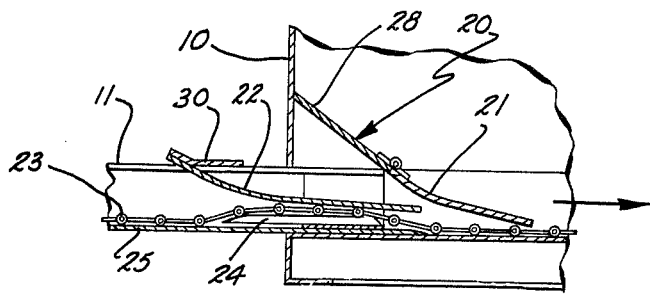
FIG. 1 is a fragmentary, sectional, elevational view taken along the plane through the hopper and trough.
Figure 2:
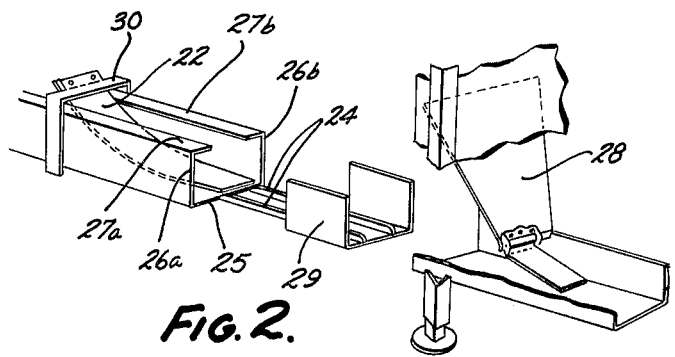
FIG. 2 is an exploded, fragmentary view of the components making up this feed return gate assembly.

In executing the objects and purposes of this invention, I have provided in the combination of a hopper, a trough, an endless conveyor traveling through the trough and the hopper, and an improved feed return gate assembly which includes an elongated runner means having at least two spaced runners extending upwardly from the bottom of the trough and running along the length thereof. One of the gates extends downwardly from the top portion of the trough converging with the bottom of the trough at a small angle and in the direction of the movement of the endless conveyor. The free end of this finger or gate is located above the runner and rides on the conveyor. The conveyor rides on the runners allowing the feed to fall through the links of the conveyor. In this manner, the backing up and spilling of feed is prevented.

Referring specifically to the drawings, reference numeral 10 designates a hopper having a trough 11 communicating therewith and extending entirely through the hopper. At the junction of the hopper and trough is provided the feed return gate assembly 20 which includes two pivotally or resiliently mounted gates 21 and 22. Traveling through the trough is the chain 23 constructed of links as more clearly shown in FIG. 3. This chain is driven through the trough by any conventional means. The feed return gate also includes the runners 24 mounted at the juncture of the trough and hopper immediately below the gate or finger 22.

The hopper of this invention is the conventional type of hopper which contains feed which falls by gravity into the bottom of the hopper and into the trough 11. Antibridging means (not shown) is generally provided to assure a constant supply of feed to the chain as it flows in the trough through the hopper. It is to be understood that this invention relates to the intake portion of the hopper and particularly to the feed return gate associated with the hopper for reintroducing feed into the hopper the hopper into the trough.

The trough also is of a conventional design, generally U-shaped. As shown, it has a bottom 25 and two sides 26a and 26b and two inwardly extending flanges 27a and 27b. As will be noted, the trough inside the hopper does not have the inwardly extending flanges 27a and 27b and preferably the sides 26a and 26b are cut short so as to easily receive the feed as it falls downwardly through the hopper into the trough.

It should be understood that the trough consists of a plurality of sections normally so arranged that they form a closed loop with the trough within the hopper.

Immediately within the hopper 10 and overlying the trough is a stationary, sloping baffle 28. The baffle 28 prevents the bulk feed in the hopper 10 from reaching the area of the trough immediately adjacent the point where it enters the hopper.

Mounted on the baffle 28 is a gate or finger 21 which extends downwardly toward the bottom of the trough and serves the function of compressing the feed as is more fully described in Patent No. 2,866,536.

Seated in the bottom of the trough 11 is the endless chain 23 which traverses the entire loop formed by the trough and serves as the conveyor means by which the feed is removed from the hopper and transported around the loop and returned to the hopper. When the equipment is in operation, this chain is in constant slow movement in the direction indicated by the arrow in FIGS. 1 and 3. The particular type and design of the chain is immaterial to this invention. It must be comprised of material which has openings therein through which the feed can fall to the bottom of the trough for the purposes as will be described hereinafter.

Figure 3:
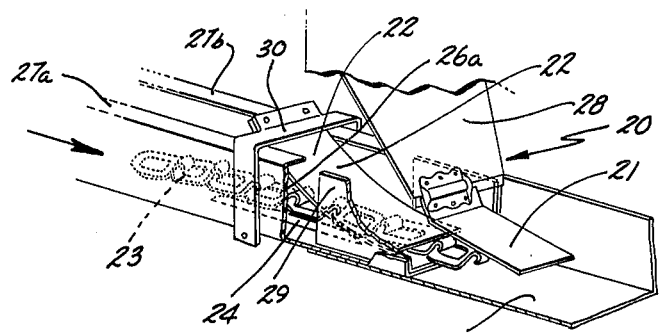
FIG. 3 is a perspective view of the feed return gate assembly of this invention.

In accordance with this invention, I provided an insert 29 conforming substantially to the shape of the inside of the trough 11. This insert 29 is U-shaped and has mounted thereon the two runners 24. The runners 24 extend a distance beyond the length of the insert 29 and accordingly as shown are substantially longer than the insert. The insert 29 fits inside the trough 11 as shown by FIGS. 1 and 3 so as to mount the runners 24 lengthwise within the trough and spaced laterally thereof.

It will be noted that mounted above the runners 24 is another gate 22 which is secured to a bracket 30 mounted to the sides 26a and 26b of the trough 11. This finger or gate extends downwardly converging at a small angle with the bottom of the trough in the direction of the movement of the inlet conveyor or chain 23.

Assembly and operation

Having described all of the components of my invention, their assembly and operation should be obvious. As previously stated the trough is composed of several sections and accordingly the trough, chain and hopper are all shipped separately and assembled at the place of use.

In assembling the feed return gate the insert 29 is inserted into the end section of the trough which is to fit into the hopper. This insert is fitted into the trough with the runners 24 underneath the gate or finger 22. Next, all of the trough is connected together and the section of the trough having the insert 29 is inserted in the opening of the hopper in alignment with the trough within the hopper. It will be noted that the baffle 28 serves as a stop for the trough 11. After all of the trough sections are assembled into a continuous loop the chain is inserted in the trough. This chain is inserted in the position shown by FIGS. 1 and 3, that is, between the finger 22 and the runners 24 so that the chain rides on the runners. The chain is then connected to a suitable drive means.

With the chain 23 in position and the trough and hopper all assembled, the chain is driven through the trough in the direction of the arrows as shown by FIGS. 1 and 3. In so doing the feed is taken out of the hopper and carried in the trough and returned to the trough through the feed return gate assembly 20. In returning to the hopper the chain is lifted upwardly over the top of the runners 24 and in so doing the feed is permitted to fall through the links of the chain. As the chain is then pulled through, it drags the feed between the runners 24 into the hopper.

This construction prevents the build-up or backing up of the feed against the gates 22 and 21 and thus prevents the spilling of the feed over the sides of the trough.

Having described my invention it should become obvious that although I have described a preferred form and embodiment, modifications and other embodiments can be made in accordance with this invention without departing from the spirit thereof. Accordingly the protection afforded this invention should be measured only by the language of the appended claims.

I claim:

1. An animal feeding apparatus comprising in combination: a hopper; a trough having closed side and bottom portions; an endless conveyor means traveling in said trough and through said hopper; and a feed return gate assembly at the junction between said trough and hopper; said feed return gate assembly including an elongated runner means including at least two spaced runners extending upwardly from the closed bottom of said trough and running along a length thereof; at least one elongated finger extending downwardly from the top portion of said trough into said trough and having a free end converging with the bottom of said trough at a small angle and in the direction of movement of said endless conveyor means; said conveyor means traveling over said runners and being raised thereby above said trough bottom; and said free end of said finger located above said runners to cooperate therewith in causing feed returned by said conveyor means to said hopper to drop away from the conveyor to the bottom of the trough.

2. A feed return gate assembly for a hopper and trough combination comprising at least two spaced runners extending upwardly from the closed bottom of said trough and running along a length thereof; at least one elongated finger extending downwardly from the top portion of said trough into said trough and having a free end converging with the said closed bottom of said trough at a small angle; said free end of said finger located above said runners; and said finger and runners cooperating to raise a conveyor means within said trough from the closed bottom thereof and cause feed carried by the conveyor to drop away therefrom to the said closed bottom of the trough.

3. A feed return gate assembly for a hopper and trough combination, comprising: an insert conforming to the cross-sectional shape of said trough and adapted to fit therein; at least two spaced runners mounted on said insert and extending upwardly from the closed bottom of said trough and running along a length thereof; at least one elongated finger extending downwardly from the top portion of said trough into said trough and having a free end converging with the said closed bottom of said trough at a small angle and in the direction of movement of said endless conveyor; said free end of said finger located above said runners; and said finger and runners cooperating to raise a conveyor means within said trough from the closed bottom thereof and cause feed carried by the conveyor to drop away therefrom to the said closed bottom of the trough.

4. A runner construction for a trough and hopper feed intake, comprising: a feed return gate assembly for a hopper and generally closed trough combination; said assembly comprising an insert conforming to the cross-sectional shape of said trough and adapted to fit therein, at least two spaced runners mounted on said insert and extending upwardly from the closed bottom of said trough and running along a length thereof, at least one elongated finger extending downwardly from the top portion of said trough into said trough and having a free end converging with the said closed bottom of said trough at a small angle and in the direction of movement of said endless conveyor, said free end of said finger located above said runners running longitudinally thereof, said runners being spaced laterally across said insert; and said finger and runners cooperating to raise a conveyor means within said trough from the closed bottom thereof and cause feed carried by the conveyor to drop away therefrom to the said closed bottom of the trough.

References Cited by the Examiner

UNITED STATES PATENTS

| 1,840,294 | 1/1932 | Richards | 198—57 X |
| 2,866,536 | 12/1958 | Smallegan | 198—57 |

SAMUEL F. COLEMAN, *Primary Examiner.*

WILLIAM B. LABORDE, *Examiner.*